June 26, 1951
A. A. DROS
2,558,481
COMBINATION COMPRISING A HOT-GAS ENGINE AND
A PISTON MACHINE DRIVEN THEREBY
Filed July 19, 1948
3 Sheets-Sheet 1
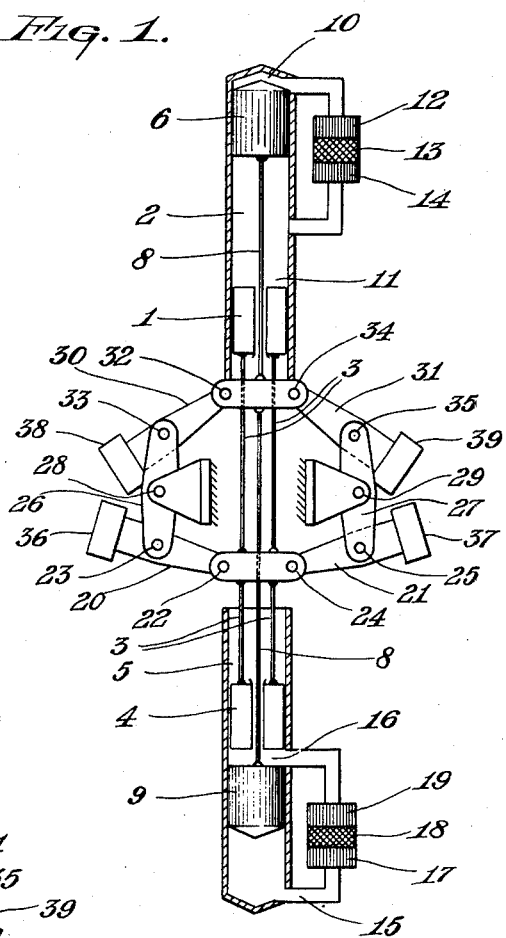
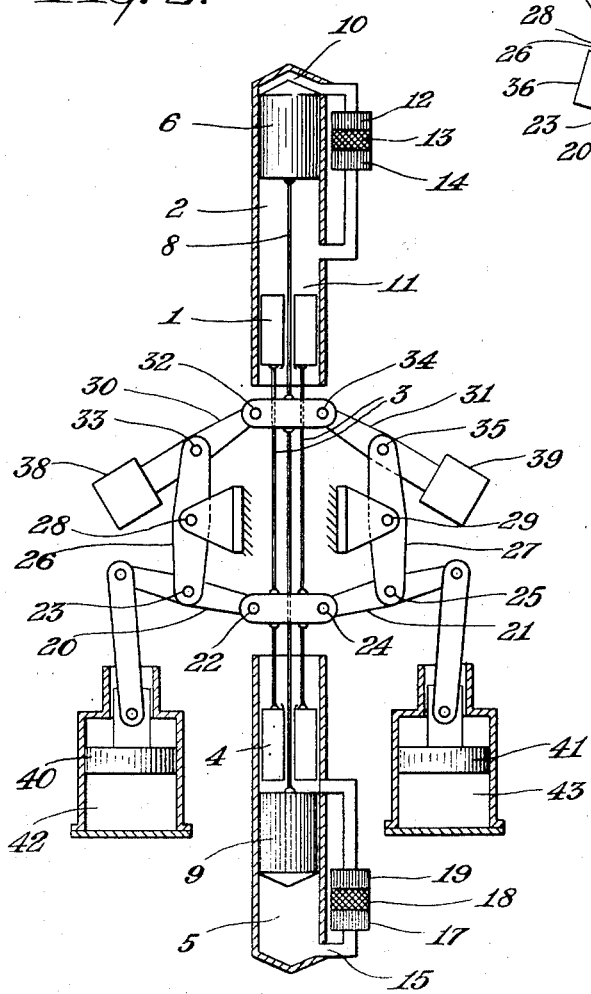
INVENTOR.
ALBERT A. DROS
BY
Fred M. Vogel
AGENT.

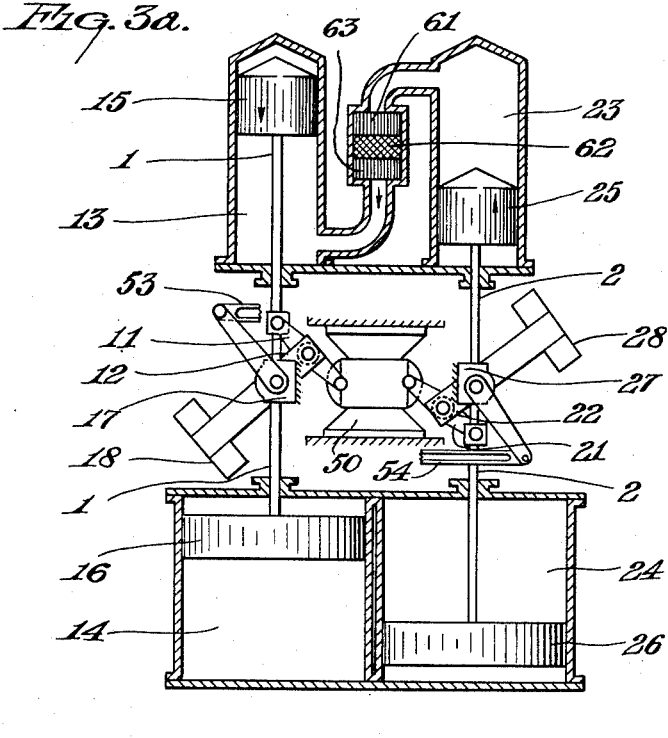
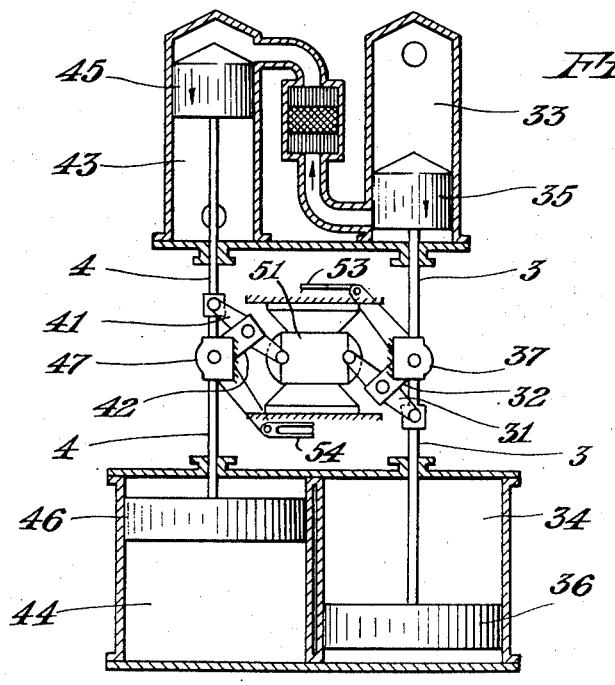

June 26, 1951

A. A. DROS 2,558,481

COMBINATION COMPRISING A HOT-GAS ENGINE AND
A PISTON MACHINE DRIVEN THEREBY

Filed July 19, 1948

INVENTOR.
ALBERT A. DROS

BY

Fred M. Vogel

AGENT.

Patented June 26, 1951

2,558,481

UNITED STATES PATENT OFFICE 2,558,481

COMBINATION COMPRISING A HOT-GAS ENGINE AND A PISTON MACHINE DRIVEN THEREBY

Albert A. Dros, Eindhoven, Netherlands, assignor to Hartford National Bank and Trust Company, Hartford, Conn., as trustee Application July 19, 1948, Serial No. 39,544
In the Netherlands August 23, 1947

8 Claims. (Cl. 62—136)

1

This invention relates to a combination comprising a hot-gas piston apparatus and a piston machine which is either driven thereby or which drives the combination. The term "hot-gas piston apparatus" is to be understood to mean a hot-gas engine or a refrigerating machine operating on the reversed hot-gas engine principle.

The invention enables the hot-gas piston apparatus and the piston machine driven thereby or driving the combination to be combined so as to obtain a combination extremely compact, light in weight and simple in construction. Furthermore, such a combination may be so constructed that the mass forces and moments of the moving parts substantially neutralise one another.

In addition, the mechanical efficiency of a combination constructed in accordance with the invention is higher than that of the combinations hitherto known.

Finally, the gas pressures permissible in a combination according to the invention are higher than those used in the combinations hitherto known, which again favourably affects the efficiency and the dimensions and weight of the combinations.

The combinations constructed in accordance with the invention have the characteristic that the stroke of the pistons and the phase difference between the pistons of the hot-gas piston apparatus are maintained constant by a driving mechanism which is constituted solely by reciprocating parts. Such driving mechanisms applied to combustion motors or steam engines are already known. Thus, since combustion motors or steam engines, however, comprise various valves or slides which are required to be actuated at the right moments and since the movements thereof may be derived from a rotary shaft more readily than from reciprocating members, driving mechanisms comprised solely of reciprocating members and in which, therefore, no rotary shaft is provided, are not particularly suitable for use in combinations in which the driving engine is a combustion motor or a steam engine.

This disadvantage does not apply to combinations according to the invention, since neither hot-gas engines nor most of the piston machines driven such, for example, as compressors or pumps, comprise valves or slides which are

2 required to be actuated mechanically. On the contrary, hot-gas engines and also refrigerating machines operating on the reversed hot-gas engine principle only require piston movements with a suitable phase difference between two pistons acting upon one space.

Since the driving mechanisms used in combinations according to the invention are, for kinematic reasons, always required to be so constructed that a phase difference of 90° between the movements of two pistons is maintained, such driving mechanisms are excellently suitable for synchronising the piston movements of the last-mentioned apparatus.

In one advantageous embodiment of the invention, the combination has the characteristic that the phase difference required between the movements of two pistons of the hot-gas engine belonging to a single cycle is obtained by coupling the movements of the pistons by means of one or more members reciprocating at right angles to the movements of the pistons with double the frequency of the reciprocating movements of the pistons. In this case, a simple construction may be obtained if the pistons of the hot-gas apparatus and the piston or pistons of the machine driven are coupled by means of cranks. Furthermore, it may be advantageous if the working pistons of the hot-gas apparatus move in a sense opposite to that of the pistons of the driven or driving machine.

In a further advantageous embodiment of the invention, the combination has the characteristic that the straight-guide of the piston rods is provided by means of straight-guided members moving with double the frequency at right angles to the piston rods, and levers by which the said members are articulated to the piston rods, the centre of each lever being constrained to describe a path in the form of an arc of a circle by means of cranks engaging this centre.

In this case a simple construction may be obtained if the combination comprises a 4-cylinder hot-gas engine and a machine to be driven which also comprises four cylinders. In such a construction, the four piston rods, each of which connects one piston of the engine to one piston of the machine to be driven, intersect a plane normal to the piston rods at the corners of a square, rectangle or parallelogram. In this combination a determined phase difference is maintained between two piston rods belonging to one pair, the four piston rods being divided into two pairs, by means of a member reciprocating with double the frequency at right angles to the piston rods and articulated to the associated piston rods, while each pair of piston rods, which move with double the phase difference of the first-mentioned phase difference, are interconnected by means of a coupling member.

For a simple arrangement, it may be of importance that the driving mechanism is provided between the cylinders of the hot-gas engine and the cylinders of the machine driven.

The invention affords particular advantages if the piston rods of the hot-gas engine are immovably connected to corresponding piston rods of a refrigerating machine, operating on the reversed hot-gas engine principle, which is to be driven by this hot-gas engine.

The invention will now be explained more fully by reference to the accompanying drawing wherein:

Figure 1 is a vertical cross-sectional view of a diagrammatic representation of one form of the invention wherein a hot-gas engine drives a piston machine which is a refrigerating machine via common piston rods;

Figure 2 is a view similar to that shown in Figure 1 but of a modification of that structure wherein piston machines are linked into the combination so that the pistons of the last machine move in a sense opposite to those of the hot-gas engine;

Figure 3a is a vertical cross-sectional view of a diagrammatic representation of another form of the invention wherein four cylinders are incorporated in the combination; the section being taken on the line III$^a$—III$^a$ in Figure 4;

Figure 3b is another vertical cross-sectional view of the embodiment shown in Figures 3a and 4; the section being taken on the line III$^b$—III$^b$ in Figure 4;

Figure 4:
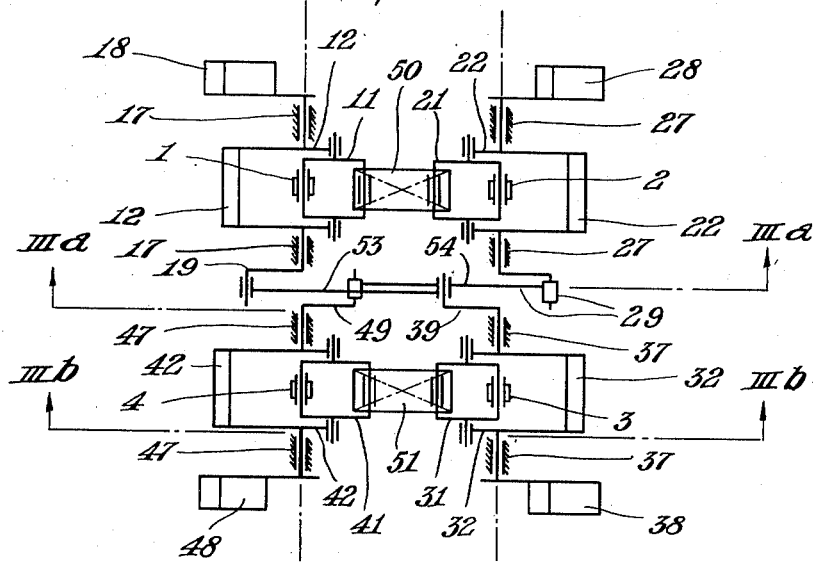
Figure 4 is a diagrammatic representation of a horizontal sectional view of the driving mechanism illustrated in Figures 3a and 3b.

The arrangement of the combination shown in Fig. 1 is as follows: The piston 1 in cylinder 2 of the hot-gas engine is immovably connected, by means of hollow piston rods 3, to the piston 4 in cylinder 5 of the machine driven, which in this case is a refrigerating machine operating on the reversed hot-gas engine principle.

Similarly, the piston 6 in cylinder 2 is immovably connected, by means of the piston rods 8, to the piston 9 in cylinder 5. The two pistons 6 and 9 operate as displacers in the working spaces of the hot-gas engine and the refrigerating machine, respectively. The working space of the hot-gas engine comprises a hot portion 10, and a cold portion 11. Interposed therebetween are a heater 12, a regenerator 13, and cooler 14. Similarly, the working space of the refrigerating machine comprises a cold space 15 and a hot space 16, between which are interposed a cooler 17, a regenerator 18 and a heat-absorber 19.

The piston rod 3 is articulated by means of levers 20 and 21 and bearings 22, 23 and 24, 25, respectively, to reciprocating members 26 and 27 respectively, which are arranged symmetrically in order to avoid any action of transverse forces upon the piston rods 3.

The two reciprocating members 26 and 27 are in this case comprised of two balanced levers which are centrally pivoted at 28 and 29, respectively.

The movement of the bearings 23 and 25 of the balanced levers is substantially at right angles to the piston rods 3.

It will readily be evident that the frequency of the number of deflections of the balanced levers 26 and 27 is twice that of the reciprocating movement of the piston rods 3.

Similarly, the piston rods 8 are articulated by means of levers 30 and 31, respectively, and bearings 32, 33 and 34, 35, respectively, to the other side of the balanced levers 26 and 27, respectively.

When the piston rods 8 pass through the centre of the stroke, the levers 30 and 31 are at right angles thereto, thus limiting the deflection of the balanced levers 26 and 27 to one direction. Thus, the stroke of the piston rods 3 is also limited in either direction.

Similarly, the stroke of the piston rods 8 is limited in either direction, since at the centre of the stroke of piston rods 3 the deflection of the balanced levers 26 and 27 in the other direction is limited by the levers 20 and 21.

In this manner the two piston rods 3 and 8 mutually limit their strokes, thus also maintaining a phase difference of 90° between the movements of the two piston rods. In order to balance the mass forces produced by the moving parts, the levers 20, 21 and 30, 31 are provided with counterweights 36, 37, 38 and 39, respectively.

The combination shown in Fig. 2 essentially differs from that in Fig. 1 only in that, instead of counterweights provided on the levers 20 and 21, two pistons 40 and 41 of the machine driven are operated by the levers 20 and 21 in a sense opposite to the movement of pistons 1 of the hot-gas engine.

The machine driven is in this case a compressor comprising cylinders 42 and 43, which compressor is of the double-acting type.

The cylinder 5, together with the two pistons 4 and 9, constitutes in this case a second cylinder of an engine, so that the combination now comprises two engines. The operation of this combination will be readily evident after the foregoing.

In some cases such a combination will afford advantages with respect to a combination as shown in Fig. 1 since, on account of the movement of the pistons in opposite senses, some counterweights may be dispensed with and the combination may be equipped in a simple manner with two engines.

Figure 5:
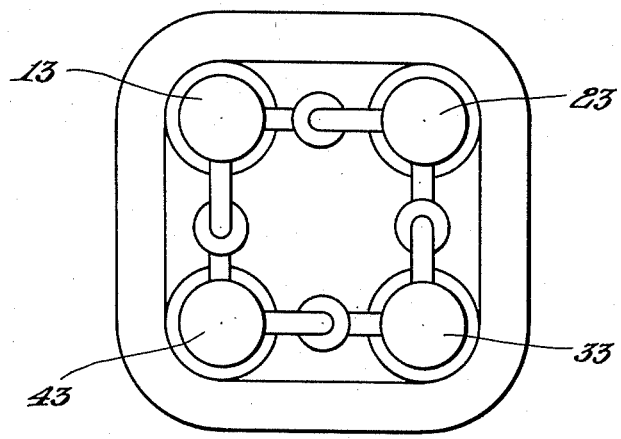
Figure 5 is a plan view of the combination shown in Figures 3a and 3b taken in the direction of the arrow H in Figure 3b, for example.

In the combination shown in Figures 3a, 3b, 4 and 5 use is made of a driving mechanism which incorporates some fundamental improvements.

The driving mechanisms used in the combinations shown in Figs. 1 and 2 are of the double-acting type, that is to say they are constituted by parts positioned symmetrically with respect to the piston rods. This is necessary since it is thus ensured that the lateral reaction forces exerted on the piston rods by the levers neutralize one another.

It is unnecessary that a double-acting construction of the driving mechanism implies the inclusion of undesired complications. The driving mechanism of the combination shown in Figure 3a, etc., provides a solution for a single-acting driving mechanism by which the stroke of, and the phase difference between the pistons is maintained constant.

This is ensured by providing exactly straight guides 50' and 51' for members 50 and 51, respectively, which reciprocate with double the frequency at right angles to the piston rods 1, 2, 3 and 4, and by forcing the centre of each of the levers 11, 21, 31 and 41, by which the members are articulated to the piston rods, to describe a path having the shape of an arc of a circle. For this purpose the centre of each said lever is pivotally mounted on a crank 12, 22, 32, 42 respectively, the centre of which is located in the centre line of the piston rods 1, 2, 3, 4, respectively, and the radius of which is half the length of the lever. An exactly straight guide is thus also provided for the piston rods, so that the latter are not subject to lateral reaction forces. With the adoption of such an arrangement there are no longer objections against the use of a driving mechanism of the single-acting type.

A second difference between this combination and the combinations shown in Figs. 1 and 2 consists in that the former combination is constituted by 4 parallel cylinders 13, 23, 33 and 43 of the hot-gas engine and 4 parallel cylinders 14, 24, 34 and 44, arranged coaxially therewith, of the machine driven.

The cylinders are so positioned that the piston rods 1, 2, 3 and 4, by which the pistons 15, 25, 35 and 45 in the hot-gas engine cylinders 13, 23, 33 and 43, respectively, are connected to the pistons 16, 26, 36 and 46, respectively, in the cylinders 14, 24, 34 and 44 respectively of the machine driven, intersect a plane at right angles to the piston rods at the corners of a square. If desired, the cylinders may alternatively be so positioned that this is a rectangle or a parallelogram. Such an arrangement per se of the cylinders of a hot-gas engine is already known.

The movements of the pistons 15, 25, 35, and 45, as controlled by the crank arrangement described, is such that piston 15 leads by 90° with respect to piston 25, piston 25 leads by 90° with respect to piston 35, piston 35 leads by 90° with respect to piston 45, and piston 45 leads by 90° with respect to piston 15. In a manner already known the bottom of each piston 15, 25, 35 and 45 may act upon a cold space (the bottom of each cylinder, for example 13) which communicates via a cooler 63, a regenerator 62, and a heater 61, with the hot top of a cylinder, for example 23, so that the bottom of one piston and the top of a subsequent piston jointly act upon the same space as clearly shown in Figures 3a and 3b.

If the machine driven is a refrigerating machine operating on the reversed hot-gas engine principle, this may be constructed in a similar manner.

The operation of the driving mechanism described above is the following. When piston rod 1 is at the centre of the stroke, the lever 11 is at right angles thereto, thus limiting the deflection (reciprocation in this case) of the member 50 to the right only. The stroke of the piston rod 2, which is also connected to this member by means of the lever 21, is thus limited in either direction in a manner similar to that described with regard to the driving mechanisms shown in Figs. 1 and 2. When piston rod 2 is at the centre of the stroke, the deflection (reciprocation) of the member 50 is thus limited to the left only, the stroke of the piston rod 1 thus being limited in either direction. Consequently, the piston rods 1 and 2 reciprocate with a phase difference of 90° and mutually limit their strokes.

Exactly the same operation takes place between the piston rods 3 and 4. The requirement that the movements of the piston rods 2, 3 and 4, 1 respectively should also take place with a 90° phase difference may also be formulated differently, viz, that the piston rods 1, 3 and 4, 1 respectively are required to move with a phase difference of 180°. This is ensured in the following way.

The crank 12, which engages at the centre of lever 11 and which is pivoted on the frame at 17 is immovably connected to the crank 19. The crank 32, which engages at the centre of lever 31 and which is pivoted on the frame at 37, is immovably connected to the crank 39.

Since the two cranks 19 and 39 are connected by means of a coupling rod 53, the cranks 12 and 32 are required to move in synchronism. It is readily clear that the piston rods 1 and 3 are thus constrained to move in opposite senses and hence with a phase difference of 180°.

Similarly, the cranks 22 and 42 are synchronized by means of a coupling rod 54, by which the two cranks 29 and 49, which are integral with the cranks 22 and 42, are interconnected and by which the piston rods 2 and 4 are constrained to move in opposite senses and hence with a phase difference of 180°.

In order to balance the combination, the cranks 12, 22, 32 and 42 are provided with counterweights. Furthermore, the shafts of the said cranks are extended beyond the fixed bearings 17, 27, 37 and 47 respectively and carry other counterweights bearing the numbers 18, 28, 38 and 48, respectively.

The combination may be substantially balanced by means of the said counterweights which move in a sense opposite to that of the pistons.

As many changes may be made in this construction without departing from the scope of the appended claims, it is intended that all matter contained in the above description or shown in the accompanying drawing shall be interpreted as illustrative only and not in a limiting sense. For example, it may be mentioned that the members 50 and 51 may be constructed in a different manner. Their straight guide may be provided either by means of shoes which are adapted to move along guide paths as shown in the drawing, or by means of sector-like rollers which roll down on straight paths or in any other known manner.

What I claim is:

1. In combination: a hot-gas piston engine and a piston machine operatively associated therewith, mechanical means interlinking the pistons of said hot-gas piston engine and said piston machine for maintaining constant both the strokes of all of said pistons and the phase relationship between said pistons of said hot-gas piston engine, said mechanical means consisting solely of reciprocating elements.

2. In combination: a hot-gas piston engine and a piston machine operatively associated therewith, mechanical means interlinking the pistons of said hot-gas piston engine and said piston machine for maintaining constant both the strokes of all of said pistons and the phase relationship between said pistons of said hot-gas piston engine, said mechanical means consisting solely of reciprocating elements, some of which reciprocate at right angles to the movement of said pistons and at double the frequency thereof.

3. In combination: a hot-gas piston engine and a piston machine operatively associated therewith, mechanical means interlinking the pistons of said hot-gas piston engine and said piston machine for maintaining constant both the strokes of all of said pistons and the phase relationship between said pistons of said hot-gas piston engine, said mechanical means consisting solely of reciprocating elements and including cranks.

4. In combination: a hot-gas piston engine and a piston machine operatively associated therewith, mechanical means interlinking the pistons of said hot-gas piston engine and said piston machine for maintaining constant both the strokes of all of said pistons and the phase relationship between said pistons of said hot-gas piston engine and for assuring that the pistons of said piston machine move in a sense opposite to that of said pistons of said hot-gas piston engine, said mechanical means consisting solely of reciprocating elements.

5. In combination: a hot-gas piston engine and a piston machine operatively associated therewith, mechanical means including piston rods interlinking the pistons of said hot-gas piston engine and said piston machine for maintaining constant both the strokes of all of said pistons and the phase relationship between said pistons of said hot-gas piston engine, said mechanical means consisting solely of reciprocating elements, said reciprocating elements in turn comprising those which reciprocate longitudinally at right angles to the movement of said pistons and at double the frequency thereof, and others which connect said piston rods to said longitudinally reciprocating elements, and means including cranks constraining each of said other reciprocating elements to describe a path in the form of an arc of a circle.

6. In combination: a four-cylinder hot-gas piston engine and a four-cylinder piston machine operatively associately therewith, four piston rods each connected to a piston of said hot-gas piston engine and a piston of said piston engine, each of said piston rods intersecting a plane normal to said piston rods at the corners of a parallelogram, mechanical means interlinking said piston rods of said hot-gas piston engine and said piston machine for maintaining constant both the strokes of all of said pistons and the phase relationship between a pair of said piston rods, said mechanical means consisting solely of reciprocating elements, said reciprocating elements in turn comprising a pair of said elements which reciprocate longitudinally at right angles to the movement of said pistons and at double the frequency thereof, means connecting each of said pair of said elements to one said pair of piston rods, and coupling member means interconnecting one of each pair of piston rods to a corresponding one of the other pair of piston rods.

7. In combination: a four-cylinder hot-gas piston engine and a four-cylinder piston machine operatively associated therewith, four piston rods each connected to a piston of said hot-gas piston engine and a piston of said piston engine, each of said piston rods intersecting a plane normal to said piston rods at the corners of a parallelogram, mechanical means interlinking said piston rods of said hot-gas piston engine and said piston machine for maintaining constant both the strokes of all of said pistons and the phase relationship between a pair of said piston rods, said mechanical means consisting solely of reciprocating elements, said reciprocating elements in turn comprising a pair of said elements which reciprocate longitudinally at right angles to the movement of said pistons and at double the frequency thereof, means connecting each of said pair of said elements to one said pair of piston rods, and coupling member means interconnecting one of each pair of piston rods to a corresponding one of the other pair of piston rods, said mechanical means being positioned between the cylinders of said hot-gas piston engine on one side and the cylinders of said piston machine on the other.

8. In combination: a hot-gas piston engine and a refrigerating apparatus operating on the reversed hot-gas engine principle associated therewith, mechanical means interlinking the pistons of said hot-gas piston engine and said refrigerating apparatus for maintaining constant both the strokes of said pistons and the phase relationship between said pistons of said hot-gas piston engine and of said refrigerating apparatus, said mechanical means consisting solely of reciprocating elements.

ALBERT A. DROS.

REFERENCES CITED

The following references are of record in the file of this patent:

UNITED STATES PATENTS

| Number | Name | Date |
|---|---|---|
| 30,373 | Barton | Oct. 9, 1860 |
| 1,603,779 | Koenig | Oct. 19, 1926 |
| 1,604,734 | Batchler | Oct. 26, 1926 |
| 2,002,200 | Gehres | May 21, 1935 |
| 2,468,293 | Du Pre | Apr. 26, 1949 |